UNITED STATES PATENT OFFICE.

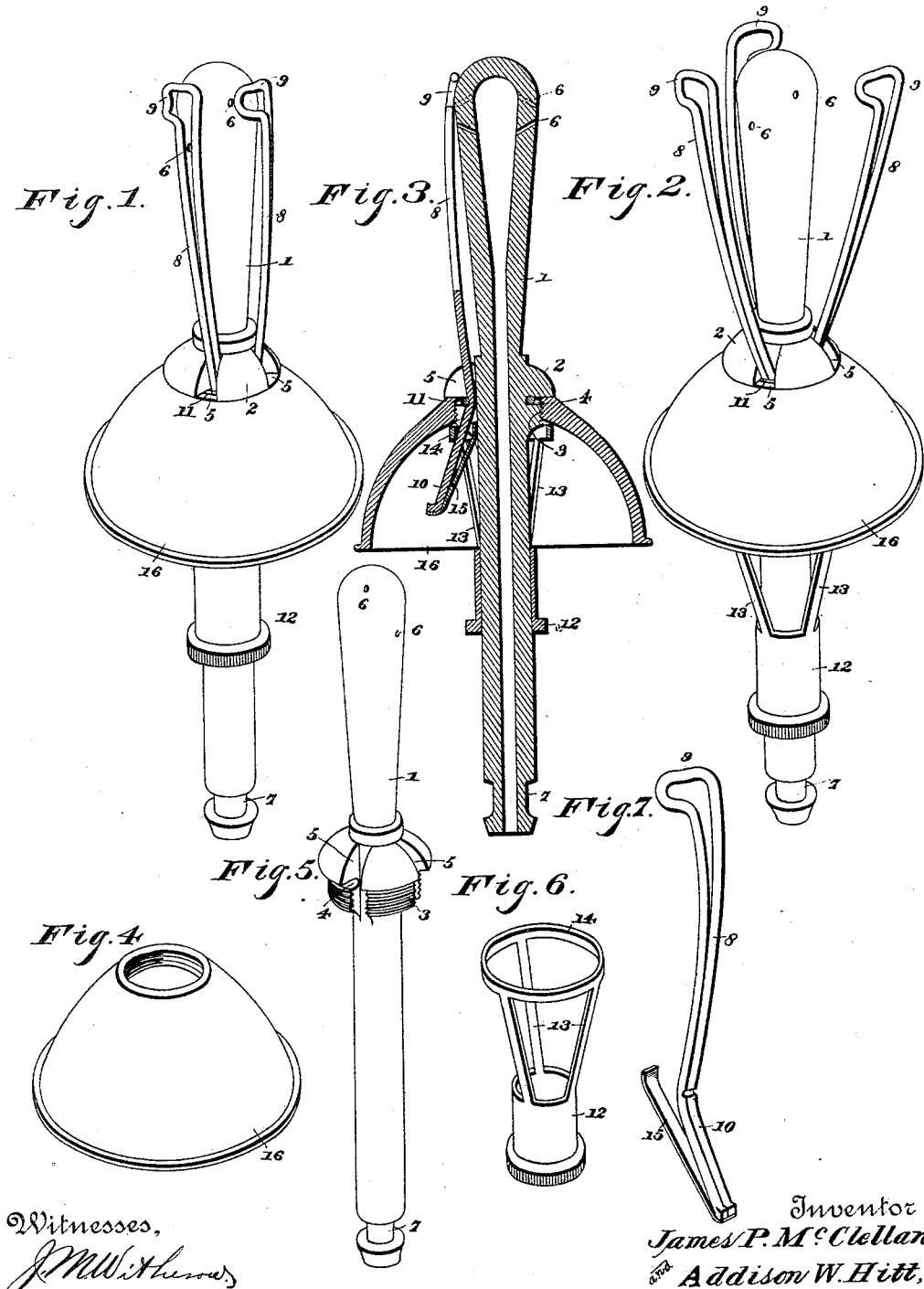

JAMES P. McCLELLAN AND ADDISON W. HITT, OF THAYER, MISSOURI.

VAGINAL SYRINGE.

SPECIFICATION forming part of Letters Patent No. 426,047, dated April 22, 1890.

Application filed December 23, 1889. Serial No. 334,633. (No model.)

*To all whom it may concern:*

Be it known that we, JAMES P. MCCLELLAN and ADDISON W. HITT, citizens of the United States, residing at Thayer, in the county of Oregon and State of Missouri, have invented a new and useful Device for Washing or Medically Treating the Vagina, of which the following is a specification.

This invention relates to that class of devices for washing or medically treating the vagina in which the nozzle for injecting the water or medicated liquid is provided with hinged arms or wings for the purpose of dilating the walls of the vagina; and it has for its object to construct a device of this class which shall be simple and conveniently manipulated, which shall serve to retain the injected fluid in the vagina for any desired length of time, and which may be used without danger of injury to the parts which are being treated.

With these ends in view the invention consists in the improved construction, arrangement, and combination of parts which will be hereinafter fully described, and particularly pointed out in the claims.

In the drawings hereto annexed, Figure 1 is a perspective view of the device, the wings or arms of the same being collapsed. Fig. 2 is a perspective view showing the device with the wings or arms expanded. Fig. 3 is a longitudinal view of the device as shown in Fig. 1. Fig. 4 is a detail view of the shield. Fig. 5 is a detail view of the nozzle. Fig. 6 is a detail view of the operating-sleeve. Fig. 7 is a detail view of one of the dilators.

Like numerals of reference indicate like parts in all the figures.

1 designates a nozzle, which may be constructed of metal, hard rubber, or other suitable material, and which may be of any suitable and convenient shape and dimensions. Said nozzle is provided about midway of its length with a collar or enlargement, the upper end of which is rounded smoothly, as at 2, while its lower end is screw-threaded, as shown at 3. An annular groove 4 separates the upper and lower parts of said collar, and the latter is provided with a series of equidistant slits or notches 5 5, which may be three in number.

The upper end of the nozzle 1 is provided with openings 6 6, which are inclined in opposite directions upwardly and downwardly, and the lower end of the nozzle has an annular groove 7, to enable it to be conveniently and securely connected with the soft-rubber tube of a syringe of ordinary construction.

8 8 designate the dilating arms or wings, which are constructed preferably of wire, and which are provided at their upper ends with laterally-extending loops 9 and at their lower ends with outwardly-extending arms 10. The loops 9 at the upper ends of the said arms fold closely around the tip or extreme outer or upper end of the nozzle, thereby facilitating the entrance of the device into the vagina. The arms 8 8 are seated in the slits or notches 5 5 of the annular collar of the nozzle and are retained by a ring or wire band 11, which is twisted around them, in the groove 4 of the said collar, and upon which they may turn, as upon a hinge, without danger of displacement.

Upon the lower end of the nozzle slides a sleeve 12, which is provided with upwardly and outwardly extending arms 13 13, the upper ends of which are connected by a ring 14, which encircles the outwardly-extending arms 10 at the lower ends of the dilating wings. Springs 15 are interposed between the said arms 10 and the body of the nozzle, which serve to hold the upper ends of the dilating wings normally flat against the nozzle. It will be seen that by sliding the sleeve 12 downwardly upon the nozzle the ring 14 will compress the arms 10 upon the body of the nozzle, and thereby dilate the wings or force the upper ends of the latter in an outward direction. When the sleeve 12 is moved upward upon the nozzle, the tension of the springs 15 serves to restore the dilating wings to their normal position.

16 designates a bulb or shield having a female screw-thread, whereby it is adjusted upon the screw-threaded portion 3 of the annular collar upon the nozzle. This shield completely covers the annular groove and the lower ends of the slits or recesses in which the dilating wings are seated, as well as the outwardly-extending arms at the lower ends of the said wings, and it forms a smooth and regular downward extension of the smoothly-rounded upper portion 2 of the annular collar of the nozzle.

The operation of this invention and its advantages will be readily understood from the foregoing description, taken in connection with the drawings hereto annexed. By its use the walls of the vagina may be thoroughly and painlessly distended, thereby enabling any cleansing or medicated fluid which may be injected to reach every part. At the same time the shield or bulb 16 may be pressed upward, so as to close the mouth of the vagina, thereby retaining the injected liquid for any desired length of time.

We desire it to be understood that we do not limit ourselves to the precise construction of the details of the device which have been herein shown and described, but reserve the right to any modifications which may be resorted to without departing from the spirit of our invention.

Having thus described our invention, we claim and desire to secure by Letters Patent of the United States—

1. In a speculum-syringe, the combination of the nozzle, the dilating wings hinged to the same and having outwardly-extending arms at their lower ends, the springs interposed between said arms and the nozzle, and a longitudinally-sliding sleeve having a ring encircling the arms of the dilating wings, substantially as and for the purpose set forth.

2. The combination of the nozzle, the dilating wings, the springs to hold the latter normally in contact with the nozzle, the longitudinally-sliding operating-sleeve having a ring encircling and engaging the outwardly-extending arms at the lower ends of the dilating wings, and the bulb or shield mounted upon the nozzle above the hinged portions of the dilating wings, substantially as set forth.

3. The combination of the nozzle having an annular collar provided with slits or recesses and with an annular groove, the dilating wings mounted in said slits and hinged by means of a band fitted in the annular groove, a shield or bulb mounted upon said annular collar, springs interposed between the nozzle and outwardly-extending arms at the lower ends of the dilating wings, and a longitudinally-sliding operating-sleeve having arms connected by a ring which encircles the arms at the lower ends of the dilating wings, substantially as and for the purpose herein set forth.

In testimony that we claim the foregoing as our own we have hereto affixed our signatures in presence of two witnesses.

JAMES P. McCLELLAN.
ADDISON W. HITT.

Witnesses:
J. W. WILSON,
W. A. LLOYD.